(No Model.)

D. G. WEEMS.
Artificial Stone or Marble.

No. 238,623. Patented March 8, 1881.

Witnesses,
W. A. Bertram
G. H. Postil

Inventor,
David G. Weems
by
R. D. Williams
Attorney.

UNITED STATES PATENT OFFICE.

DAVID G. WEEMS, OF BALTIMORE, MARYLAND.

ARTIFICIAL STONE OR MARBLE.

SPECIFICATION forming part of Letters Patent No. 238,623, dated March 8, 1881.

Application filed January 19, 1881. (No model.)

*To all whom it may concern:*

Be it known that I, DAVID G. WEEMS, of Baltimore city, State of Maryland, have invented certain new and useful Improvements in Artificial Stone and Marble; and I hereby declare the same to be fully, clearly, and exactly described as follows, reference being had to the accompanying drawings, in which—

Figure 1:
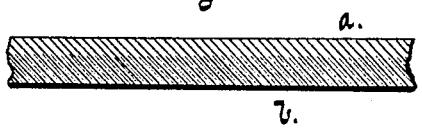
Figure 2:
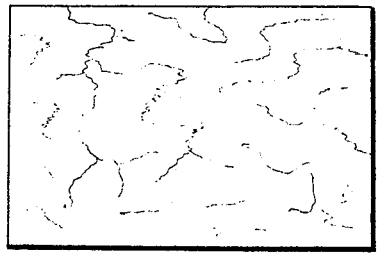

Figure 1 is a sectional view, and Fig. 2 a plan view, of a slab made according to my present invention.

The object of the same is to furnish a strong, durable, and cheap substitute for stone or marble; and it consists, first, in the composition hereinafter set forth, combined as described, and in the method of graining an imitation of Egyptian or Tennessee marble.

In practice I use as the basis for stone Portland or equivalent standard cement, and for marble, gypsum. These are combined in the proportions of about four to one, the cement predominating for stone, the gypsum for marble. To the said five parts I add about one-fifth part of silicate of soda and an equivalent proportion of dolomite, lime, or magnesia, so that the resulting double decomposition shall form a silicate of the alkaline earth or earths, be it or they lime, magnesia, or a mixture of the two. For forming a stone they are added to the cement and gypsum, with sufficient water to hydrate the whole, and the mass is placed in molds to set and dry. A quantity of sand may be added for cheap work.

In the making of an artificial marble I proceed as follows: Taking three chemical salts or substances, such as shall have in their natural state the three primary colors—red, blue, and yellow—such as cinnabar or oxide of mercury, indigo, and chromate of lead—it is evident that any desired tint may be attained by an admixture of two or all of them in certain proportions. The substances, moreover, are such as are decomposable at a heat short of that which would dehydrate or destroy the stone, and at such heat their color is lost. Having mixed them with water I sprinkle them, in any desired design, upon a glass slab, over which a greasy cloth is first rubbed, and then pour upon them the composition named, omitting the cement, (or a pure white cement may be added,) and, finally, before the mass sets, I add the cement to form a backing. This latter incorporates itself with the former and forms a close union, the parts being shown in the accompanying drawings, as at *a b*, *a* being the face material and *b* the backing. A suitable rim or bank laid on the glass determines the shape of the slab. When the slab is set it is removed from the glass, when the coloring-matter first thrown thereon will be found to have spread and run somewhat, mixing with the body of the slab and forming beautiful veins, exactly as in natural marble. The forms of these veins may be seen through the glass before the stone has set, and if they show too sharp they may be stirred with a stick or brush or the hand of the operator, so as to spread and more fully incorporate and blur them. The smooth glass forms a fine finish for the face of the stone, and obviates or greatly lessens the labor of polishing. Now, as the colors are liable to be unnaturally brilliant, I simply pass lightly over the face of the stone, in certain parts, a hot iron, which dims the pigments; or, in lieu thereof, I treat the same with chemical reagents that will destroy or modify their color. A single instance will illustrate my meaning in this connection. Assuming red oxide of mercury to be used as the color, a touch of acid and then of an alkaline sulphide will blacken or darken it; or, in the case of red oxide of copper being used, a sulphide will accomplish the same end. In this way I can readily alter and modify the graining of the finished stone.

I merely mention here a few chemical colored salts that answer the desired end; but it is obvious that others may be used.

What I claim is—

1. An artificial stone or marble composed of gypsum, cement, silicate of soda, and dolomite or alkaline earth, as set forth.

2. An artificial marble composed of gypsum, silicate of soda, and dolomite, and having a backing of Portland or equivalent cement incorporated therewith at the contact-surfaces, as set forth.

3. An artificial marble composed of gypsum, silicate of soda, and dolomite, backed with Portland cement, and having face-veins of pigments adapted to be altered as to color by heat or chemical reagents, as set forth.

4. The method herein described of graining an artificial stone, consisting in applying to the face thereof a grain or veins of pigment, and changing the color of the same by heat or chemical reaction, as set forth.

5. The method herein described of forming artificial marble, consisting in spreading or sprinkling a pigment upon a transparent surface, pouring thereon the stone or marble composition in a plastic state, and, finally, when the same is set, removing it and treating the face-veins by heat or chemical action to modify their tints, as described.

DAVID G. WEEMS.

Witnesses:
R. D. WILLIAMS,
J. W. DENNY.